United States Patent [19]

Borzym et al.

[11] 4,193,486

[45] Mar. 18, 1980

[54] DOUBLE DUMP RUNOUT TABLE

[75] Inventors: Alexander Borzym, Dearborn; John J. Borzym, Birmingham, both of Mich.

[73] Assignee: Alpha Industries, Inc., Novi, Mich.

[21] Appl. No.: 21,539

[22] Filed: Mar. 19, 1979

[51] Int. Cl.² .......................................... B65G 13/00
[52] U.S. Cl. .............................. 193/35 R; 198/782; 414/748
[58] Field of Search ............... 193/36, 35 R, 35 C, 193/40; 198/782, 785; 414/748, 745; 209/707, 517, 518, 519, 520, 521, 698

[56] References Cited

U.S. PATENT DOCUMENTS

| 2,597,941 | 5/1952 | Long | 193/35 C |
|---|---|---|---|
| 2,628,697 | 2/1953 | Prentice | 193/35 R |
| 2,781,905 | 2/1957 | Phillips | 209/518 |
| 3,054,514 | 9/1962 | Riley | 198/782 X |
| 3,348,678 | 10/1967 | Flowers | 209/698 X |

*Primary Examiner*—Robert B. Reeves

*Assistant Examiner*—Gene A. Church
*Attorney, Agent, or Firm*—Krass & Young

[57] ABSTRACT

A runout table for receiving severed lengths of tubing or other workpieces emanating from cutoff presses and discharging the severed lengths laterally on either side of the table. The runout table features pivoted Vee sides which are independently dropped to discharge the severed lengths on either side of the runout table. The pivoting movement is carried out by means of rocker shafts extending down the length of the runout table on either side, equipped with linkages spaced along the length thereof and connected to the respective Vee sides. The rocker shafts serve to provide support of the table Vee sides to prevent sagging of the Vee sides. A pair of power cylinder assemblies operate the rocker shafts acting against adjustable fixed stops which enable quick adjustment of the Vee angle to accommodate tubing of various diameters. An auxiliary cylinder is provided for either side, overcoming dead center conditions in the linkages upon initiation of a pivoting cycle.

15 Claims, 6 Drawing Figures

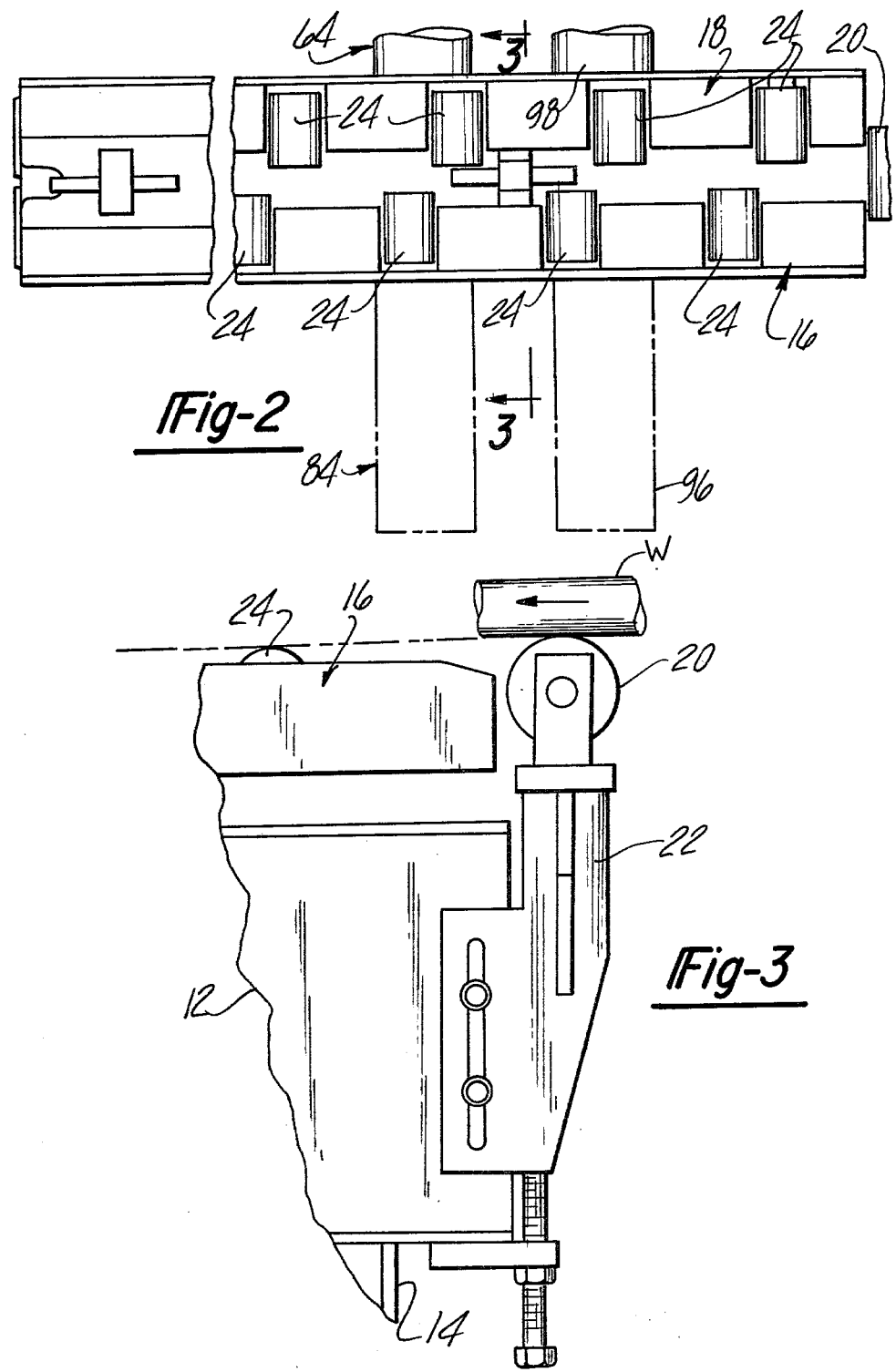

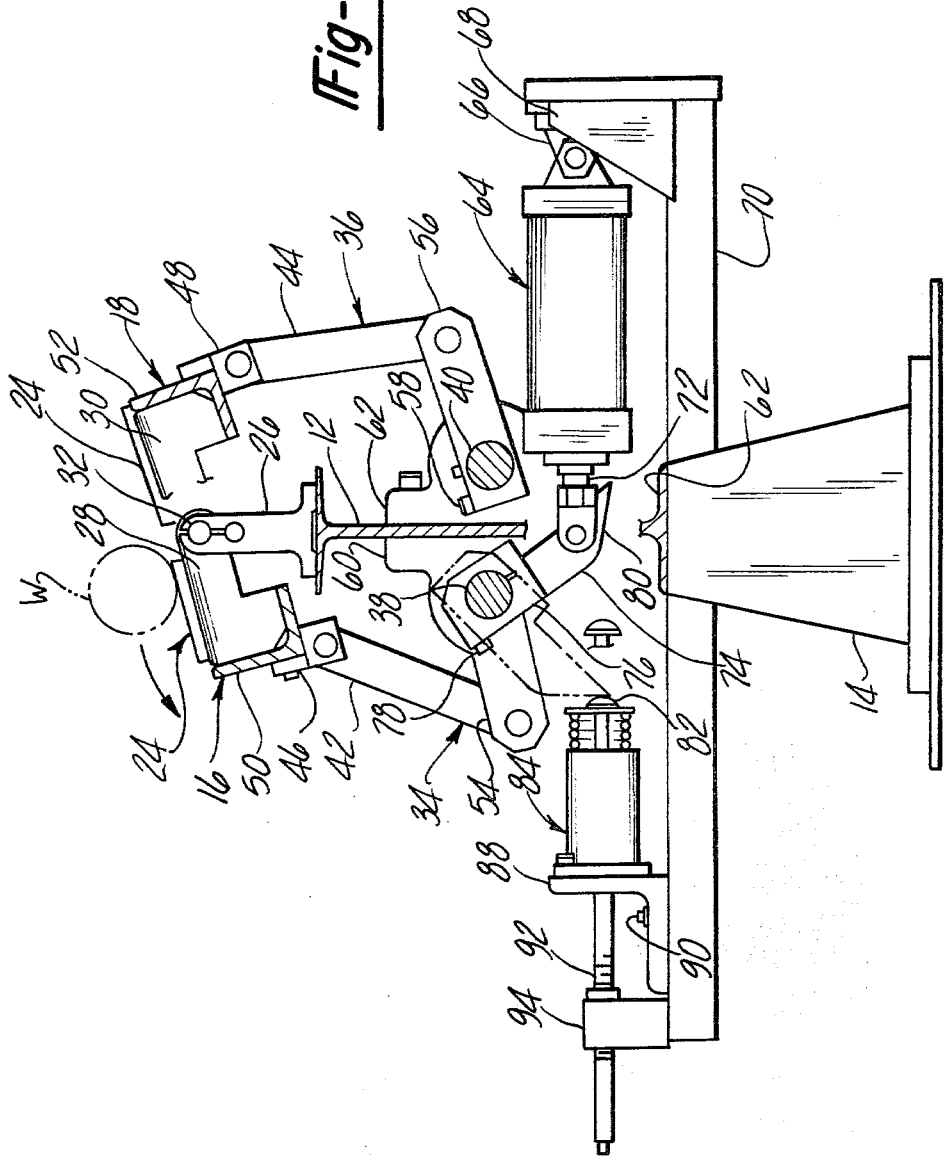

DOUBLE DUMP RUNOUT TABLE

BACKGROUND DISCUSSION

Modern mills for the production of tubes and other elongated stock forms commonly produce the tubing in endless lengths, which continuously emanate from the tubing mill. In order to provide the severing of the emanating tubing stock into the required lengths, cutoff presses are provided which receive the tubing and sever the lengths therefrom "on the fly", by arrangements which clamp the cutoff apparatus to the moving tube and sever it during a short cycle of movement during which the cutoff die set moves with the tubing. The severed lengths are then received by tube handling equipment which serves to rack or box the tubes along side the line of movement out of the tubing mill.

This equipment usually takes the form of runout tables having Vee sides, configured to receive the particular size of tubing to be handled. The runout table is pivoted along its length such as to enable the tubes to be dumped laterally into receiving shipping crates, racks, etc.

For very large tubes, this approach creates design difficulties inasmuch as the weights involved with larger tube sizes requires considerable power to operate, particularly at the rapid cycle rates at which such equipment is required to be operated. The nature of the pivoting movement is such that the slight upward motion of the tubes involved as the table pivots away requires the pivoting apparatus to slightly lift the tubing in order to dump.

It has thus heretofore been proposed to provide a runout table of this general nature in which the Vee sides are pivoted with respect to each other such as to enable them to be inclined downwardly, causing the tube length to drop directly from the runout table directly into the tube receiving structure.

This approach eliminates the requirement to lift the tubing in the process of dumping it and accordingly the design requirements for operating the apparatus are much less severe.

This arrangement involves the provision of one or more cylinders which are directly on the Vee sides, serving to raise or lower the Vee sides. However, since such runout tables must be of considerable length, on the order of forty feet or more, for standard applications, the degree of sag of the sides down the length thereof tends to become excessive, particularly after continued operation of the equipment. This drawback has heretofore precluded the successful development of such a pivoted Vee side double dump runout table.

While a number of cylinders could be provided down the length of the table, this obviously would greatly increase the cost of the equipment due to the need for additional cylinders, lines, controls, etc., and the need to adjust the various components which operate together.

Runout tables are commonly adjusted in height for use with tubing of various diameters to keep the center of the tubing at a constant height. This necessitates considerable labor in setting up different tube diameters, as well as resulting excessive down time during changeovers.

Furthermore, the use of a single fixed "Vee" configuration sometimes creates problems when relatively small tube diameters are attempted to be handled with a shallow Vee, since such small diameter tubing is flexible, and tends to be inadequately confined by the Vee sides.

Accordingly, it is an object of the present invention to provide a Vee runout table which may be quickly and easily adapted to tubing of differing diameters, and which can guide relatively flexible smaller diameter tubing.

It is another object of the present invention to provide a double dump runout table of the type described in which the Vee sides are pivoted with respect to each other, but in which the pivoting movement of the Vee sides does not result in significant sagging of the Vee sides down the length thereof.

It is a further object of the present invention to provide a relatively simple operating component for such table which serves to enable rapid cycling of the pivoting movement, and which also readily accommodates tubing of various sizes with a relatively simple adjustment to the equipment.

It is yet another object of the present invention to provide such a pivoted side double dump runout table in which the various linkages operated in a highly reliable manner.

It is a further object of the present invention to provide such equipment which may be operated by a minimum number of power cylinders, while insuring adequate structural integrity of the Vee sides.

SUMMARY OF THE INVENTION

These and other objects of the present invention, which will become apparent upon a reading of the following specification and claims, are achieved by a double dump runout table in which the Vee sides are pivoted with respect to each other along their lengths to allow swinging movement down and away of each Vee side. A power cylinder is provided for each side, actuating the pivoting movement of the respective Vee side, but the motion of the power cylinder is transmitted via rocker shafts, one each on either side, each of which extends down a respective side of the table. A series of linkages is operated by the rocker shaft which supports each of the Vee sides down the length thereof such as to insure a no-sag condition of the Vee sides, while enabling a single power cylinder to actuate the pivoting movement.

The cylinders are combined with shock absorber assemblies which serve to position each of the Vee sides in the up position, such as to provide a variable Vee angle, accommodating the various sizes of tubing. The stop acts to absorb the shock as the power cylinder is stroked, moving the sides to their elevated position.

The runout table thus may be easily adapted to tubing of various sizes by adjustment of the relative angle of the Vee sides which enables tubing of various sizes to be accommodated. The geometry is such that the center line of the supported tubing always remains at the same point, so that the equipment does not need to be height adjusted with respect to the cutoff press.

An auxiliary dead center overcoming cylinder is provided for each rocker shaft which acts directly on each of the Vee sides to cause the initial movement of the rocker shaft to be achieved directly, to overcome any tendency for the linkages to lock in a dead center position.

DESCRIPTION OF THE DRAWINGS

FIG. 2 is a plan view of the double dump runout table shown in FIG. 1 with the operating components depicted diagrammatically.

FIG. 3 is a side elevational view of the frontmost portion of the double dump runout table shown in FIG. 1 depicting the adjustable roller assembly depicted at the receiving end of the runout table.

FIG. 4 is an endwise view of the double dump runout table depicted in FIG. 1 showing the dumping motion of one of the table Vee sides.

DETAILED DESCRIPTION

Figure 1:
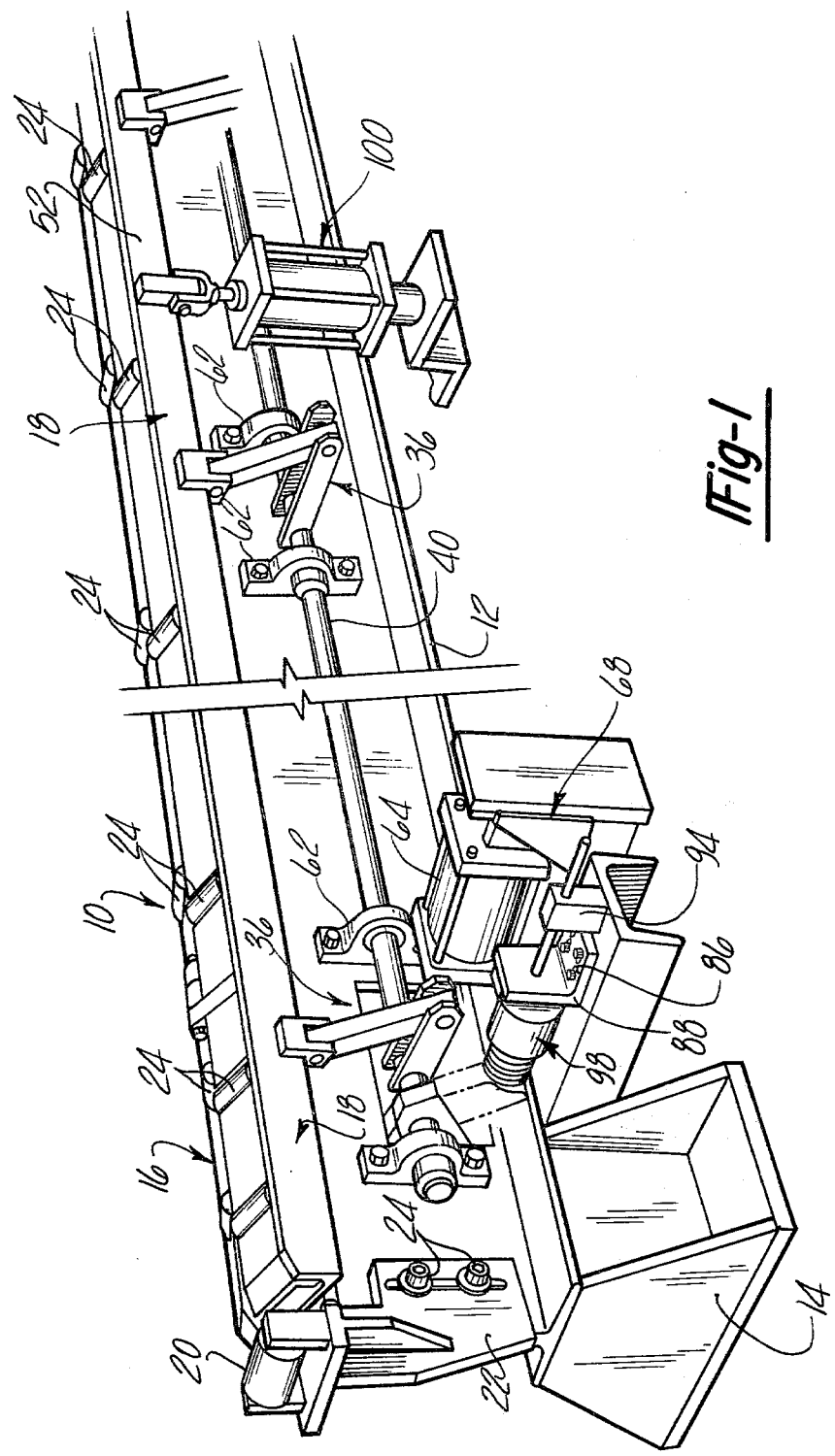
FIG. 1 is a partial perspective view of a double dump runout table showing the major operating components.

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the runout table 10 consists of a table frame 12 mounted on a plurality of frame bases 14. Pivotally supported on the table frame 12 are a pair of elongated Vee side assemblies 16 and 18 which extend along the length of the runout table 10.

The front or receiving end of the runout table 10 is provided with a roller 20 which is adjustably positioned by mounting brackets 22 and machine cap screws 24 such as to be in position to receive tubes of various diameters. Each of the Vee side assemblies 16 and 18 is pivotally mounted with respect to the table frame 12 such as to be movable between an elongated position, in which the Vee sides form a Vee trough and a down position.

In FIG. 1, both of the Vee side assemblies are depicted in the down position.

Each of the Vee side assemblies 16 and 18 includes a series of rollers 20 which serve to bear the weight of the tubing and provide free running movement of the stock along the length of the runout table 10. The pivotal mounting of the rollers 20 is staggered as shown in FIGS. 1 and 2, such as to provide maximum support for the tubing.

The pivotal mounting of each of the Vee side assemblies 16 and 18 is provided by a plurality of pedestal blocks 26 with hinges 28 and 30 receiving hinge pins 32 passing through the appropriate openings in the blocks 26 and respective hinges 28 and 30. The hinges 28 and 30 are secured to angle members 50 and 52 of each of the Vee side assemblies 16 and 18, respectively, such as to provide the pivotal support therefor.

The position of each of the Vee side assemblies 16 and 18 is controlled by a series of linkage assemblies 34 and 36, respectively, which in turn are controlled by the rotative position of respective rocker shafts 38 and 40 extending along the length of the runout table 10 parallel to the Vee side assemblies 16 and 18. The linkages 34 and 36 are provided at spaced intervals along the length of the rocker shafts 38 and 40. Each linkage 34 and 36 includes respective connecting links 42 and 44 pinned to anchor blocks 46 and 48 in turn secured to respective angle members 50 and 52. The opposite end of the connecting links 42 and 44 are pinned to crank arms 54 and 56, respectively. Crank arms 54 and 56 in turn are secured to a respective rocker shaft 38 or 40 by a clamping arrangement activated by cap screws 58 as seen in FIG. 4 so as to be rotatably joined thereto. The crank arms 54 and 56 thus rotate together with the respective rocker shafts 38 and 40.

Each of the respective rocker shafts 38 and 40 is supported for rotation by a plurality of bearing assemblies 60 and 62 spaced along the length of respective rocker shafts 38 and 40 and adjacent the linkages 34 and 36.

The rotative position of the rocker shafts 38 and 40 is controlled by power cylinder and shock absorber-stop assemblies, opposed pairs of these components being provided at longitudinally spaced locations for each rocker shaft 38 and 40.

For rocker shaft 38, the power cylinder 64 is located to the right as viewed in FIG. 4, mounted to an anchor 66, in turn mounted to angle bracket 68 welded to a length of channel iron 70 welded to the table frame 12. The operating rod 72 of the power cylinder 64 is pinned to an operating lever 74 and rotatably secured to the rocker shaft 38 by means of a split connection 76 with cap screws 78 provided to provide a secure clamping engagement therewith.

Thus, upon extension of the operating rod 72, the rocker shaft 38 is rotated counterclockwise.

The operating lever 74 has an angled face 80 which moves, as indicated in phantom in FIG. 4, into position against the stop head 82 of a shock absorber-stop assembly 84. The shock absorbers may be of conventional design serving to hydraulically absorb the impact of linkage 34 and attached Vee side assembly 16 upon movement to the up position and bottoming out at the adjusted angle of inclination of the Vee side assembly 16.

The up position of the Vee side assembly 16 is rendered adjustable by means of a slotting at 86 of the mounting bracket 88 to allow the cap strews 90 to be loosened and the lateral position of the shock absorber-stop assembly 84 adjusted. A further securement is provided by an adjustment rod 92 received in a threaded lock 94 to further secure the mounting bracket 88 against any movement caused by impact of the linkage 34.

Upon release of the power cylinder 64 fluid pressure, the weight of the Vee side assembly 16 and other components rotates the rocker shaft 38 counterclockwise. The power cylinder 64 acts as a shock absorber against movement in the down position.

A similar power cylinder 96 is provided for the rocker shaft 40 as indicated diagrammatically in FIG. 2, as is shock absorber-stop assembly 98 indicated in FIG. 1.

Thus, upon stroking of the respective power cylinders 64 and 96, the Vee side assemblies 16 and 18 move to the full up adjusted position, determined by the adjustment of the respective shock absorber-stop assemblies 84 and 98. This condition is shown in FIG. 6.

The workpiece W is thus guided on the rollers 20 laterally on the inclined Vee sides provided in the full up position. This position can be varied from the relatively shallow inclination of the right-hand Vee side assembly 16 depicted in FIG. 5 and the left-hand Vee side assembly 18 depicted in FIG. 4, to accommodate larger tubing sizes. The geometry is such that the center line of the workpiece W will remain approximately the same for different Vee side inclinations to thus accommodate various tubing sizes "on center".

Figure 6:
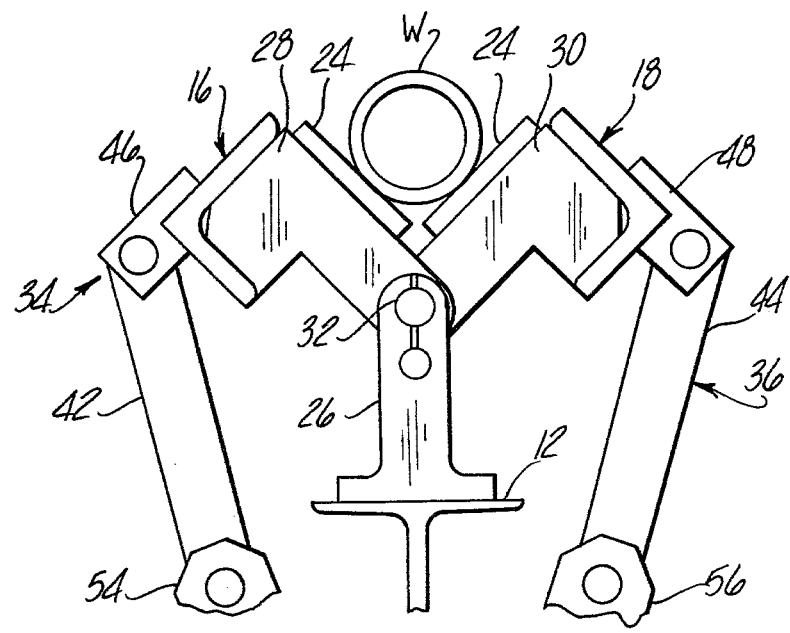
FIG. 6 is a partial side elevational view of the double dump runout table depicted in FIG. 1 showing the sides in the fully raised position.

The relatively sharply angled Vee sides 16 and 18 of FIG. 6 contact the smaller diameter tubes higher up the side of the tubing, acting to more effectively confine and guide the tubing for these more flexible sizes.

Figure 5:
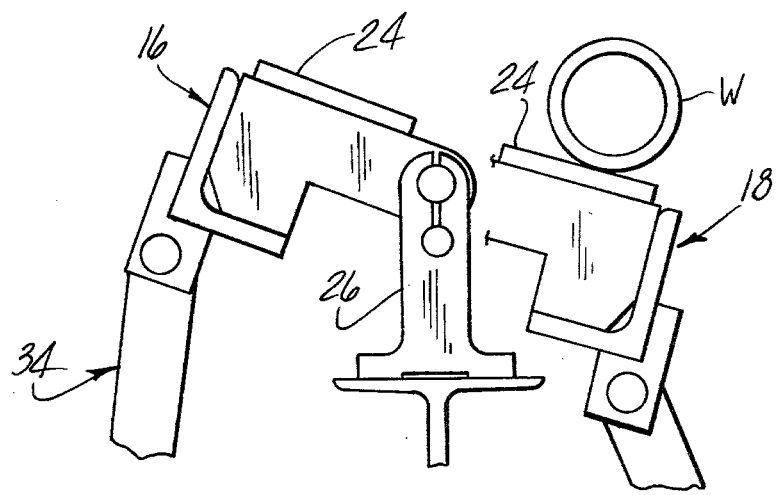
FIG. 5 is an endwise elevational view partially showing the double dump runout table of FIG. 1 and depicting the opposite Vee side assembly pivoted to the dumping position from the Vee side depicting dumping in FIG. 4.

Upon release of the pressure applied to power cylinders 64 or 96, the respective Vee side assembly 16 or 18, depending on which is released, dropping rotation of the rocker shaft 38 or 40 occurs, and the downward inclination of the rollers 20 below the horizontal allows the workpiece W to roll off to the right or left as viewed in FIG. 4 or 5.

In the more acute Vee adjusted positions, the connecting links 42 and 44 approach a dead center condition with respect to the crank arms 54 and 56, such that an auxiliary cylinder assembly 100 is provided to each Vee side assembly 16 and 18.

FIG. 1 shows the auxiliary cylinder 100 associated with that Vee side assembly, which is pinned at an intermediate point along the length of the angle member 52 and acts upon release of the power cylinder 96 to cause movement of the Vee side assembly 18 to a point whereat the dead center condition in the linkage is relieved.

Accordingly, it can be appreciated that the runout table described can quickly and easily be adjusted for tubing of varying diameters by merely adjusting the stop means against which the means pivoting the Vee sides acts, to thereby vary the up position of the sides. The resulting change in Vee angle maintains the tube contact such that the centerline of the tube remains "on center" with the machine. The smaller diameter tubes are at the same time more effectively confined by the acute Vee angle at the adjustment for these smaller tube sizes.

It can also be seen that the provisions of the pivotal movement of the Vee side assemblies 16 or 18 by means of the rocker shafts 38 and 40 provides a support down the length of the respective Vee sides 16 and 18, with part of the sag inducing loads absorbed by the torsional rigidity of the rocker shafts 38 and 40, such that the problem described above is substantially alleviated. Thus, power cylinders 64 and 96 may be provided for respective Vee side assemblies, while providing adequate support for these assemblies, notwithstanding the considerable lengths of such tables.

This is achieved with a relatively simple structure, i.e., the respective rocker shafts 38 and 40 and the associated plurality of linkages 34 and 36 together with the relatively simple supporting components. The device is thus able to operate in a highly reliable manner which will be relatively trouble free.

This thereby produces the "drop-away" action of the respective Vee side assemblies 16 and 18, such that the workpiece W is not required to be lifted during the delivery motion, to enable relatively massive tube sizes to be handled without requiring unreasonably large power cylinders and other associated operating components.

Many variations of the specifics of this design are of course possible within the scope of the appended claims.

The embodiments of the invention in which an exclusive property or privilege is claimed are defined as follows:

1. A runout table comprising:
   a table frame;
   a pair of elongated Vee side assemblies extending away from each other and along the length of said machine frame to form a supporting surface;
   means mounting said respective Vee sides for pivotal movement with respect to said machine frame from an up position extending upwardly to form a V-shaped receiving surface, to respective down positions whereat each of said Vee side assemblies is inclined downwardly below the horizontal to enable the workpiece to move by gravity laterally off said runout table;
   means for positioning each of said Vee side assemblies in said up and down positions, respectively, about said pivotal support means, said means including respective rocker shafts extending downwardly down the length of and parallel to said Vee side assemblies;
   a plurality of linkages interconnecting said respective rocker shafts and said Vee side assemblies, whereby the rotative position of said rocker shaft controls the inclination of said respective Vee side assemblies;
   means for positioning said respective rocker shafts in positions corresponding to said up and down position of said Vee side assemblies.

2. The runout table according to claim 1 wherein said means for positioning said respective rocker shafts includes power cylinder means, said power cylinder means having an operating rod and further including means drivingly connecting said operating rod to said respective rocker shaft, whereby extension and movement of said operating rod produces rotation of said respective rocker shafts.

3. The runout table according to claim 2 wherein said means for positioning said rocker shaft in said corresponding rotative positions further includes stop means limiting said rotative movement of said respective rocker shafts by said respective power cylinder means, whereby said corresponding position to said extension of said power cylinder means is controlled by said stop means.

4. The runout table according to claim 3 wherein each of said respective operating rods of said power cylinder means is drivingly connected to respective rocker shafts to produce upward movement of said respective Vee side assemblies, whereby said power cylinder means causes said respective Vee side assembly means to move to said up positon upon engagement thereof with said stop means.

5. The runout table according to claim 4 wherein said stop means includes shock absorber means whereby said movement of said respective Vee side assembly means to said up position by said respective power cylinder means is cushioned by said shock absorber means.

6. The runout table according to claim 1 wherein said respective linkages consist of a connecting link pivotably mounted with respect to said respective Vee side assemblies and further including a crank arm rotatably connected to said respective rocker shaft to rotate therewith, said crank arm assembly pinned to the free end of said connecting link.

7. The runout table according to claim 6 wherein said linkages move to approach a dead center condition in said up rotative position of said rocker shafts by causing said connecting links in said crank links to move into a dead center condition, and wherein said runout table further includes dead center overcoming auxiliary cylinder means having operating rods connected to respective Vee side assemblies, said auxiliary cylinders causing movement of the respective Vee side assemblies out of said dead center condition upon movement of said Vee side assemblies downwardly from said up position.

8. The runout table according to claim 1 wherein each of said Vee side assemblies further includes a plurality of rollers rotatably mounted thereon and spaced along the length of said respective Vee side assemblies.

9. The runout table according to claim 5 wherein each of said power cylinder stop means is located on opposite sides of said Vee side assemblies in alignment therewith, each of said stop means and power cylinder means being longitudinally spaced along the length thereof adjacent each other.

10. The runout table according to claim 4 wherein said means for drivingly connecting the operating rod of each of said power cylinder means includes an operating arm secured to respective rocker shafts.

11. The runout table according to claim 10 wherein said stop means includes surfaces formed on the respective operating arms and surfaces moving into engagement with a stop head and means further including a stop head, wherein said surfaces formed on said respective operating arms move into contact with said stop head upon extension of said operating arm and pressurization of said power cylinder means.

12. The runout table according to claim 10 wherein said stop means is adjustable and includes means adjustably positioning said stop head, whereby said up position of each of said respective Vee side assemblies is adjustable.

13. A runout table for tubular stock and the like comprising:
an elongate rigid foundation member;
first and second reversely similar support bodies each having a planar stock support surface;
pivot means mounting said bodies on said foundation member for pivotal rotation about a common axis centrally between said bodies;
said pivot means providing for each body a fully lowered position in which the planar stock support surface is angled downwardly from said central axis to dump stock therefrom, and a fully raised position in which said surfaces are reversely upwardly angled to form a vee-shaped stock cradle;
and first and second independently operable power means connected between said foundation member and said first and second support bodies, respectively, and operatively distributed along said foundation member for independently positioning said support bodies between said lowered and raised positions.

14. A runout table comprising:
a table frame;
a pair of elongated Vee side assemblies extending away from each other and along the length of said machine frame to form a supporting surface;
pivotal support means mounting said respective Vee sides for pivotal movement with respect to said machine frame from an up position extending upwardly to form a V-shaped receiving surface, to respective down positions whereat each of said Vee side assemblies is inclined downwardly below the horizontal to enable the workpiece to move by gravity laterally off said runout table;
means for positioning each of said Vee side assemblies in said up and down positions, respectively, about said pivotal support means, said means including means adjustably positioning said Vee sides in varying up positions, whereby tubing of differing diameters may be accommodated on center by the resulting varying acuteness of said Vee sides with respect to each other.

15. The runout table according to claim 14 wherein said means positioning said Vee sides comprises power means raising said Vee sides and further including adjustable stop means limiting said raising movement of said power means.

* * * * *